April 22, 1969     M. KORODI     3,439,820
FREIGHT TRANSPORTATION SYSTEMS PROVIDED WITH SIDE TRANSFER
FACILITIES FOR VARIOUS LENGTH CONTAINERS
Filed April 7, 1967     Sheet 1 of 7

INVENTOR
MIKLOS KORODI
BY
Pringle, Baird, Clayton,
Miller & Vogel ATTYS.

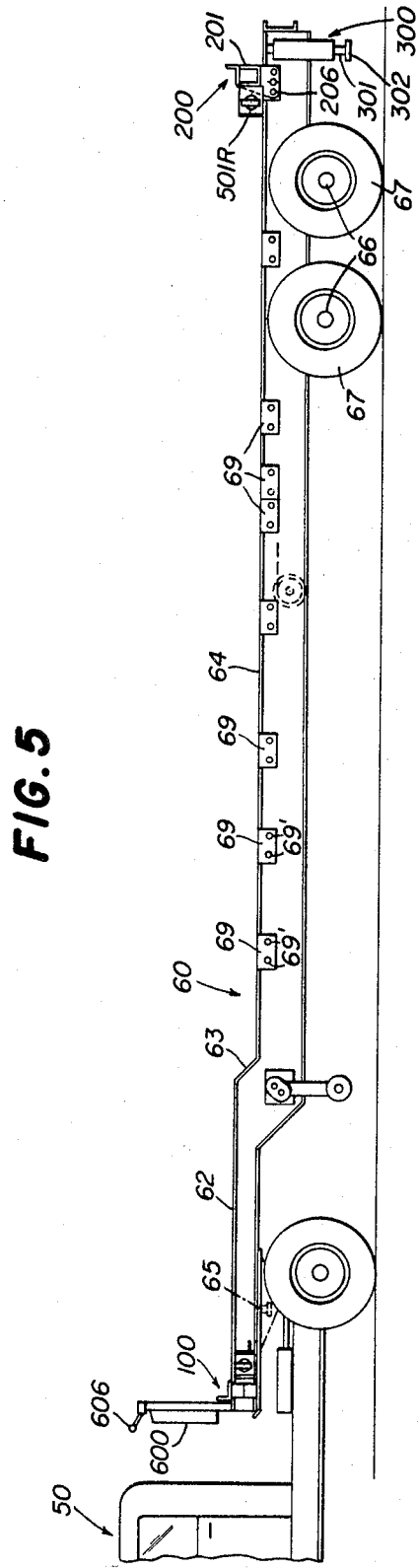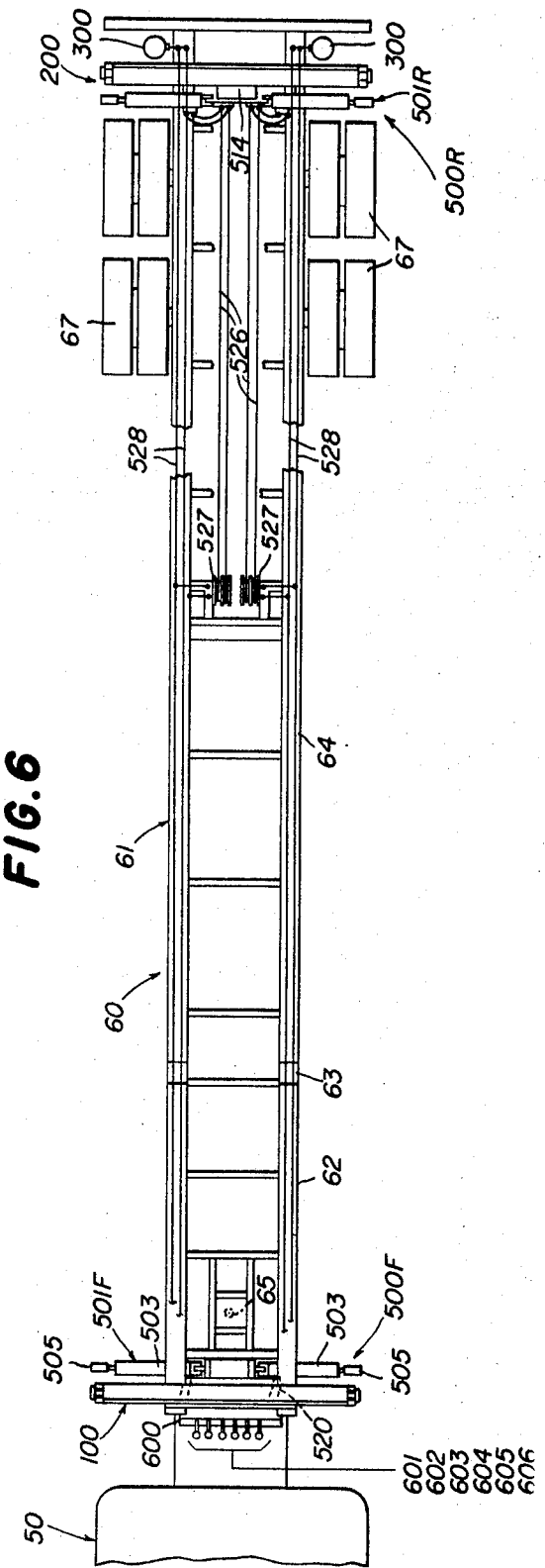

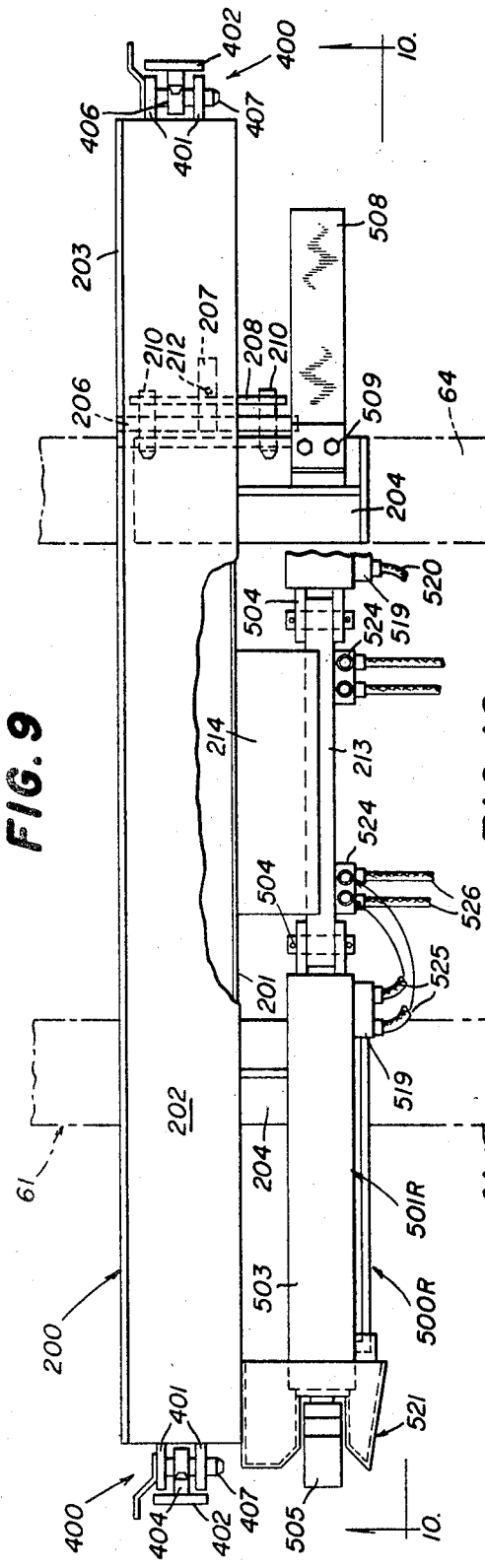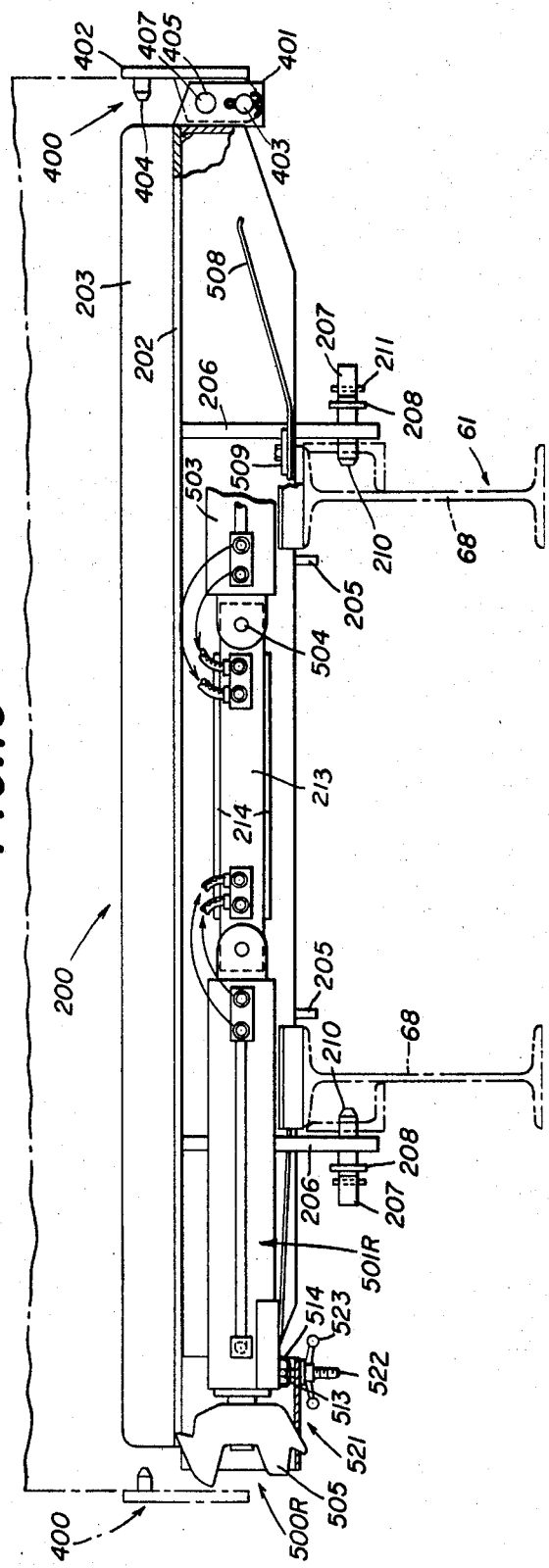

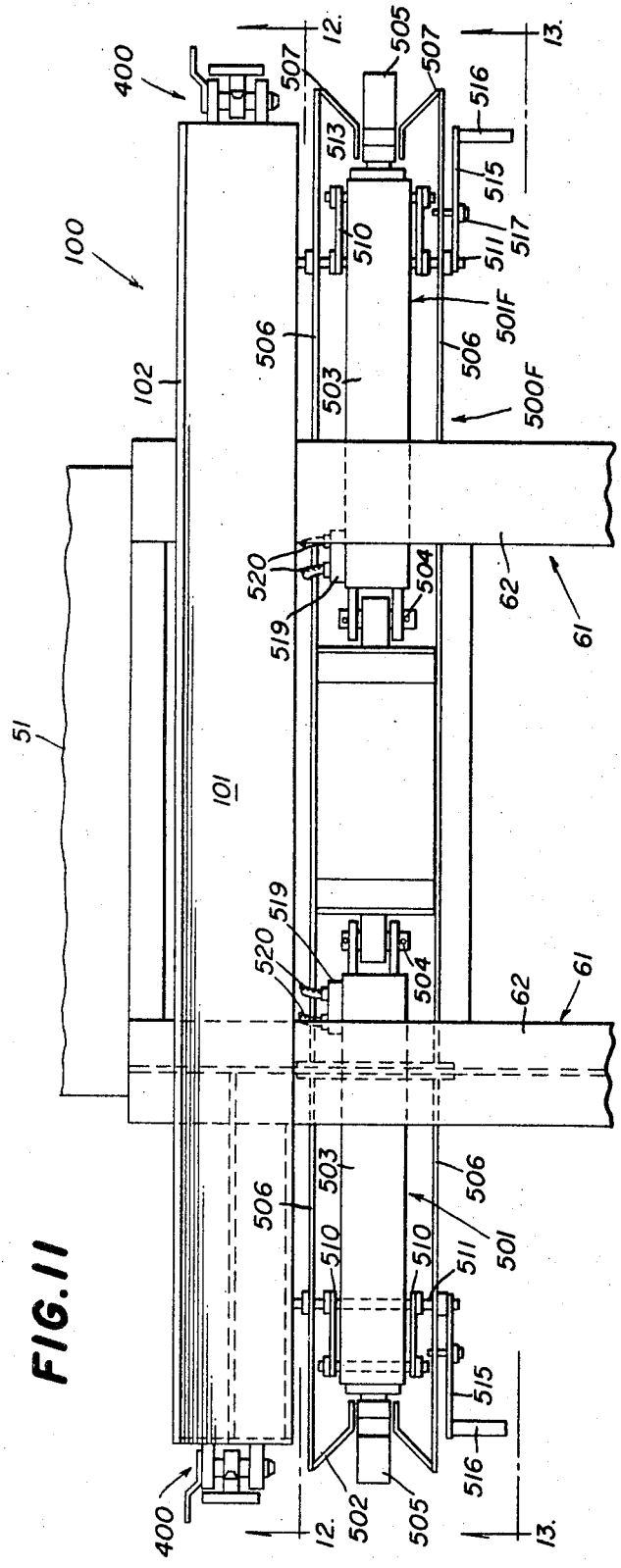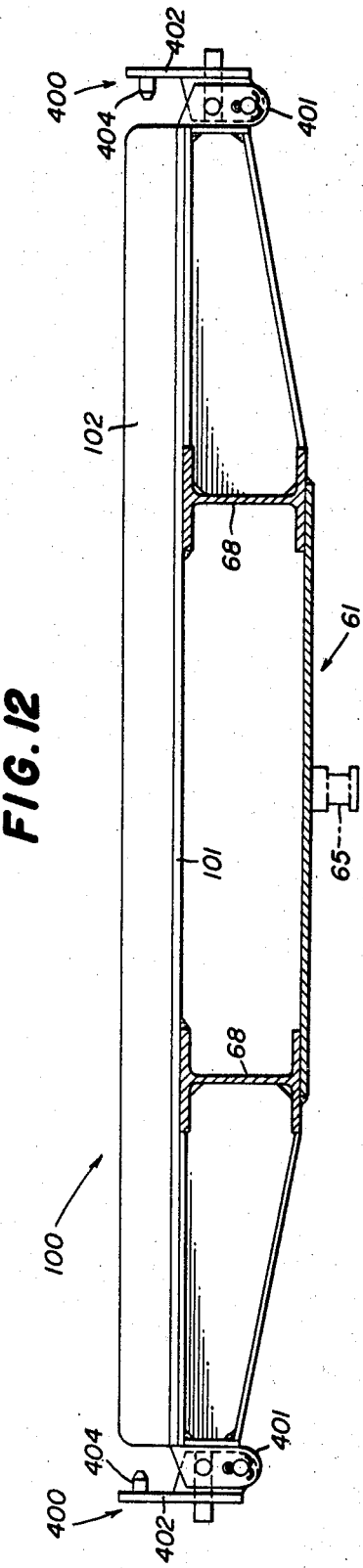

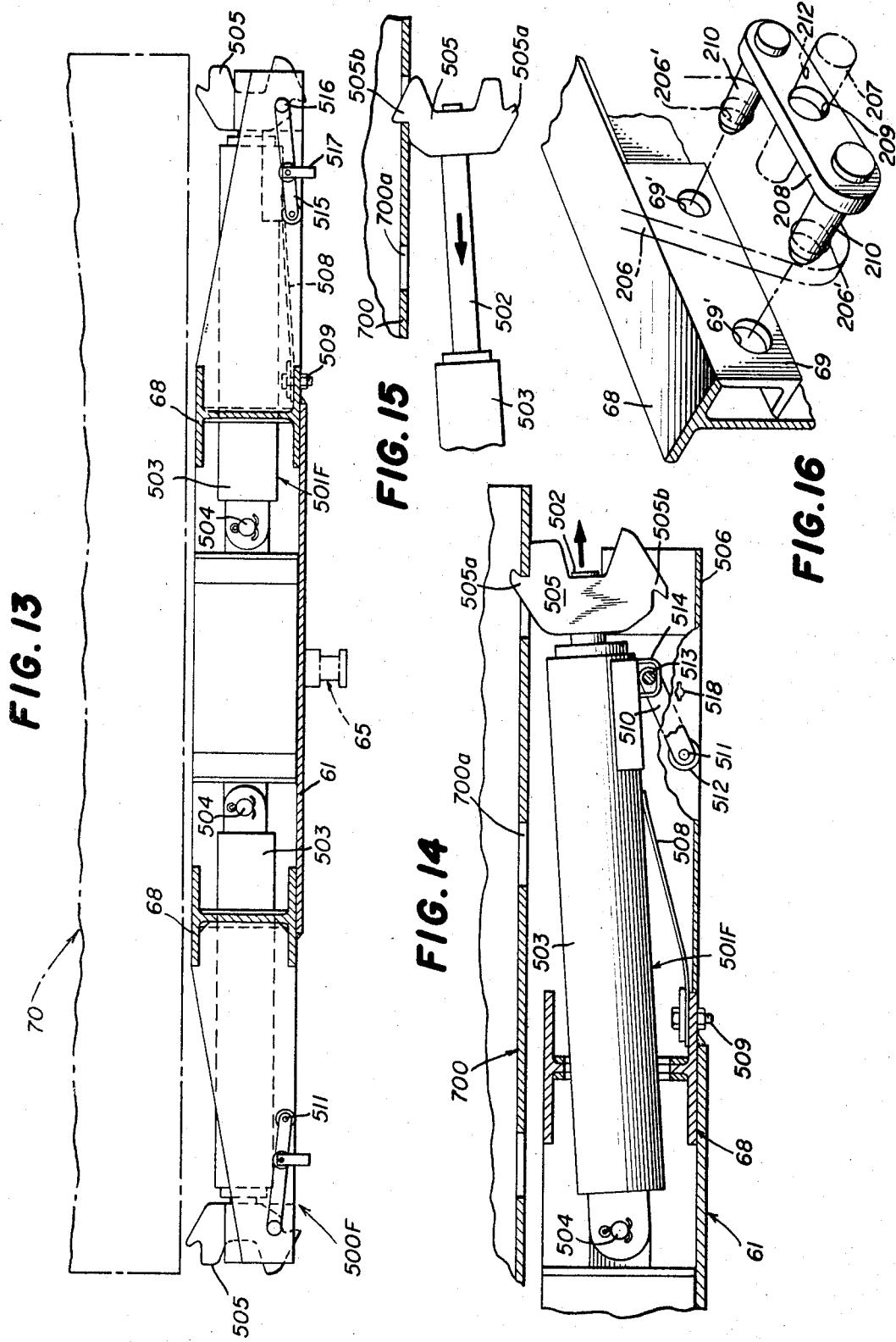

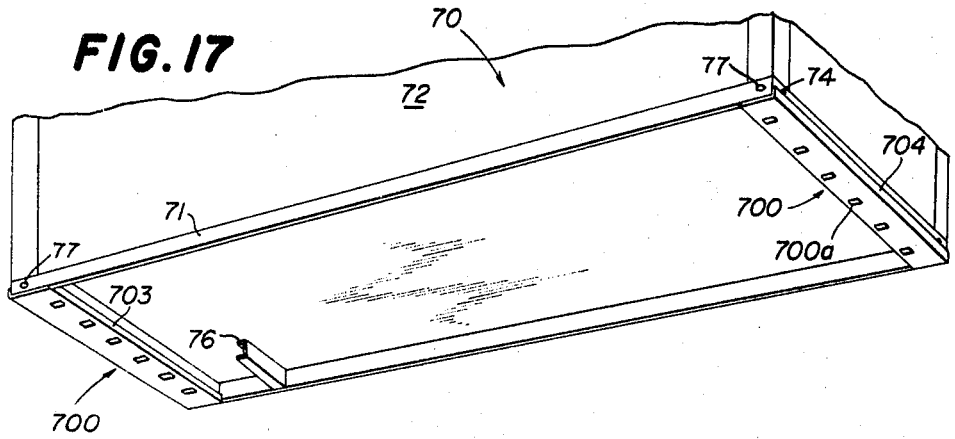
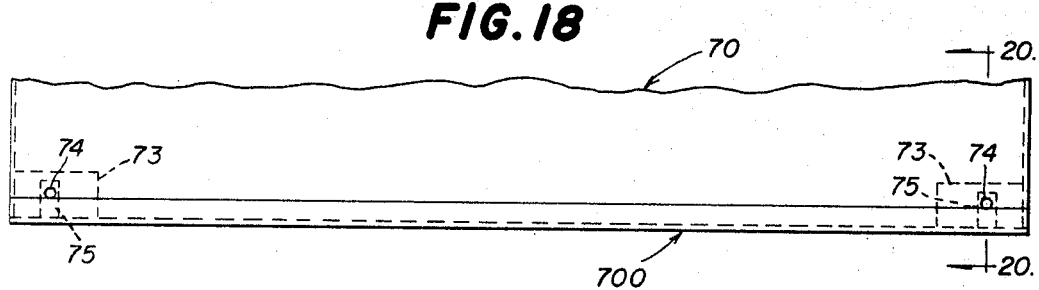
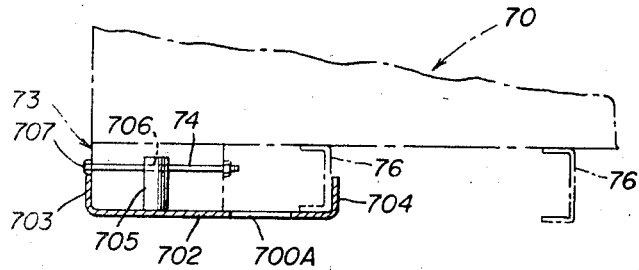
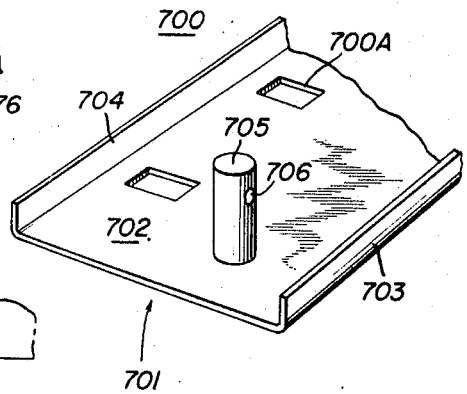
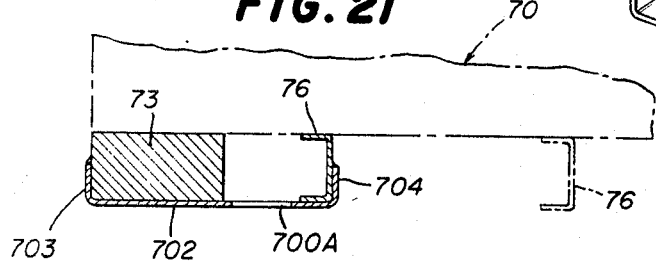

United States Patent Office 3,439,820
Patented Apr. 22, 1969

3,439,820
FREIGHT TRANSPORTATION SYSTEMS PROVIDED WITH SIDE TRANSFER FACILITIES FOR VARIOUS LENGTH CONTAINERS
Miklos Korodi, Chicago, Ill., assignor to General American Transportation Corporation, Chicago, Ill., a corporation of New York
Filed Apr. 7, 1967, Ser. No. 629,151
Int. Cl. B60p 1/64
U.S. Cl. 214—516                                    4 Claims

ABSTRACT OF THE DISCLOSURE

A road vehicle for transporting and sidewise transferring freight containers, wherein the front bolster is fixed to the chassis and the rear bolster is movable longitudinally relative to the chassis to receive containers of various lengths. Front and rear side trannsfer mechanisms are provided, the front side transfer mechanism being adjacent the front bolster and carried by the chassis; the rear transfer mechanism being carried by the rear bolster and movable therewith longitudinally relative to the chassis, whereby the rear bolster and rear side transfer mechanism are selectively adjustable to receive and transfer freight containers of various lengths.

The present invention relates to freight transportation systems provided with side transfer facilities, and it is a primary object of the invention to provide a road vehicle of improved construction and arrangement and including an elongated longitudinally extending chassis that is adapted to accommodate side loading and side unloading of freight containers of various lengths.

Another object of the invention is to provide in a freight transportation system of the character noted, a road vehicle comprising an elongated longitudinally extending chassis carrying on the top thereof a fixed bolster and a longitudinally adjustable bolster, the bolsters co-operating to define a support surface capable of transporting and sidewise transferring freight containers of various lengths.

A further object of the invention is to provide in a freight transportation system of the character noted, a road vehicle of the character described wherein a side transfer mechanism is carried by the longitudinally movable bolster, whereby selective longitudinal movement of the bolster and transfer mechanism provide, in cooperation with a fixed bolster and fixed transfer mechanism, a surface capable of receiving and transferring freight containers of various lengths.

Still a further object is to provide a rack element for use in combination with conventionally constructed freight containers having corner reinforcing members, whereupon securement of the rack member thereto the container is thereafter usable with the side transferring facilties of the present invention and with other side transfer units in general.

In one aspect of the invention there is provided in a road vehicle capable of transporting and sidewise transferring freight containers of various lengths, a chassis carrying on the top thereof a first elongated and laterally extending bolster substantially adjacent to a first end thereof. A second elongated and laterally extending bolster is also carried by the chassis, the second bolster being longitudinally spaced from the first bolster and movable longitudinally relative to the chassis, whereby the first and second bolsters cooperate to support freight containers of various lengths.

The bolsters are capable of accommodating side loading and side unloading laterally over the opposite ends thereof, of, of a freight container carrying on the bottom thereof an elongated, longitudinally extending and generally rectangular base. The first and second bolsters are adapted to engage the base of an associated container to accommodate sliding movements thereof in either lateral direction over either side of the chassis incident to side loading and unloading of the container with respect to the chassis.

A first side transfer mechanism is carried by the chassis and is positioned substantially adjacent to the first bolster. A second side transfer mechanism is carried by the second bolster and is movable therewith longitudinally of the chassis. Each of the side transfer mechanisms includes means thereon cooperable with the respective opposite ends of a base of an associated freight container to effect sidewise loading or unloading of the freight container in either lateral direction across the chassis and between two external supports respectively positioned on opposite sides of the platform.

Further features of the invention pertain to the particular construction and arrangement of the elements of the freight transportation system, and particularly to the elements of a road semi-trailer, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 5 is an enlarged side elevational view of the semi-trailer, similar to FIG. 1;

FIG. 6 is a plan view of the semi-trailer, as shown in FIG. 5;

FIG. 9 is an enlarged fragmentary plan view of the rear bolster and rear transfer mechanism, as shown in FIG. 6;

FIG. 10 is a front elevational view of the rear transfer mechanism and bolster taken along the line 10—10 in FIG. 9;

FIG. 11 is an enlarged fragmentary plan view of the front bolster and front transfer mechanism, as shown in FIG. 6;

FIG. 12 is a front elevational view of the front bolster taken along the line 12—12 of FIG. 11;

FIG. 13 is a front elevational view of the front transfer mechanism taken along the line 13—13 of FIG. 11;

FIG. 14 is an enlarged fragmentary lateral sectional view of the semi-trailer and the short container, the view being similar to the view shown in FIG. 13, and illustrating the position of one of the mechanisms for transferring the container from the semi-trailer;

FIG. 15 is a reduced fragmentary lateral sectional view of the parts shown in FIG. 14, and illustrating in greater detail the mechanism for transferring the container onto the semi-trailer;

FIG. 16 is an exploded perspective view of the locking mechanism for holding the rear bolster in selected positions on the chassis, as shown in FIG. 8;

FIG. 17 is an enlarged fragmentary bottom perspective view of the long container shown in FIG. 2;

FIG. 18 is an enlarged fragmentary end elevational view of the container shown in FIG. 17, wherein some of the details thereof are shown in dashed lines;

FIG. 19 is an enlarged fragmentary perspective view of a portable rack element usable in conjunction with freight containers of standard construction;

Figure 1:
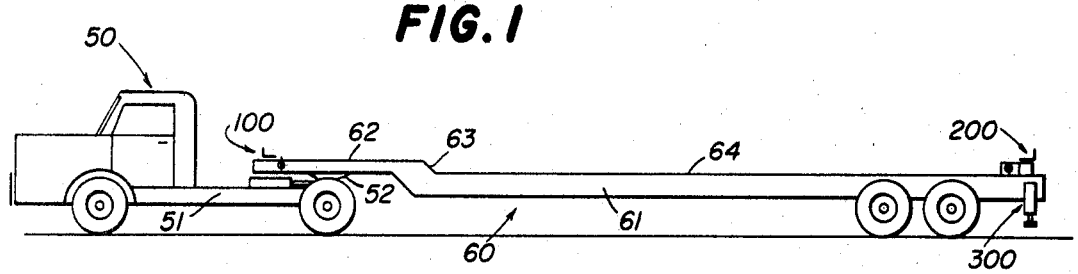
FIGURE 1 is a side elevational view of a road semi-trailer embodying the present invention.

FIG. 20 is an enlarged fragmentary elevational view showing one arrangement for securing the portable rack element shown in FIG. 18 to the base of the container of FIG. 17, taken along the line 20—20 of FIG. 18; and FIG. 21 is an enlarged fragmentary elevational view similar to FIG. 20, but showing how the portable rack element of FIG. 19 may be permanently secured to the base of a freight container.

Referring now to FIGURES 1 through 6, inclusive, of the drawings, the freight transfer system there illustrated, and embodying the features of the present invention, essentially comprises a road tractor 50, a road semi-trailer 60, a long freight container 70, a short freight container 80 and an associated railway flatcar 90. The tractor 50 is of conventional construction, including a chassis 51 carrying at the rear end thereof a fifth-wheel mechanism 52 capable of vertical adjustment or elevation in the usual manner; which mechanism 52 is adapted selectively to clutch and to unclutch a cooperating kingpin also in the usual manner. The railway flatcar 90 is also of conventional construction, including the usual underframe 91 carrying a flat deck 92, the underframe 91 being supported adjacent to the opposite ends thereof by wheeled trucks, indicated at 93.

Figure 2:
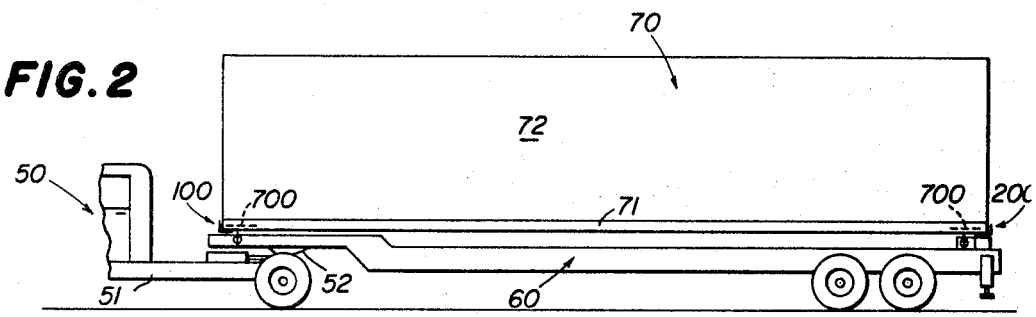
FIG. 2 is a fragmentary side elevational view of the semi-trailer of FIG. 1, illustrating a single long freight container loaded thereupon.
Figure 3:
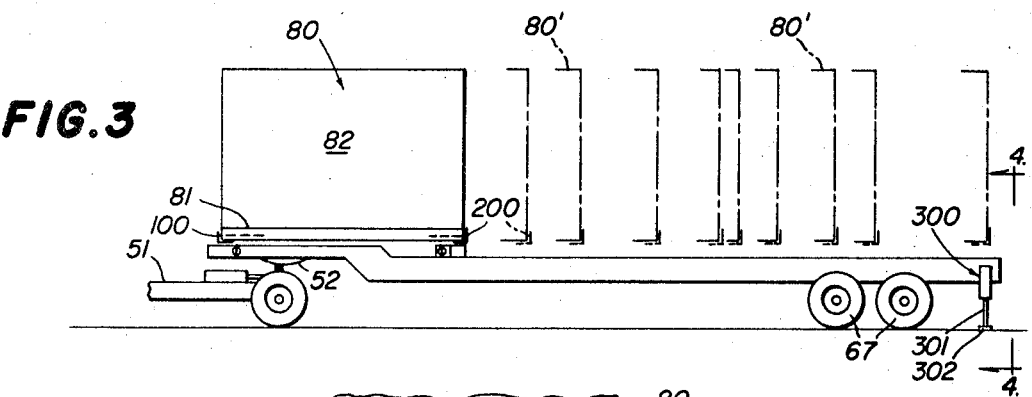
FIG. 3 is a side elevational view of the semi-trailer of FIG. 1, illustrating a short freight container loaded thereupon and wherein containers of various lengths are shown in dashed lines.
Figure 4:
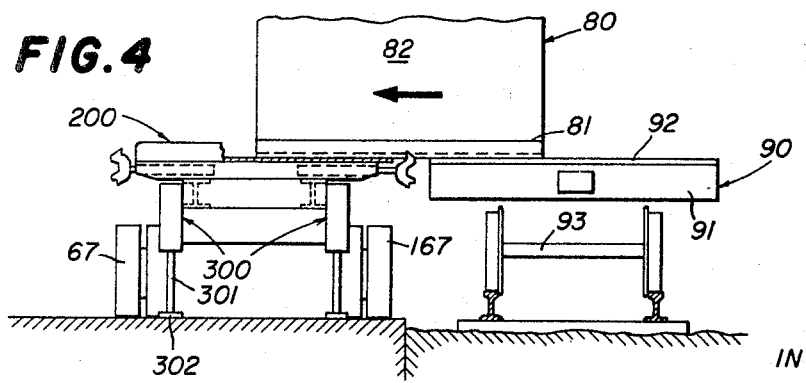
FIG. 4 is an enlarged fragmentary end view of the semi-trailer taken in the direction of the arrows along the line 4—4 in FIG. 3, and illustrating the side transfer of the long container onto the semi-trailer from an associated railway flatcar.

The semi-trailer 60 comprises an elongated longitudinally extending chassis 61, including a first horizontal section 62, a downwardly inclined section 63, and a second lower horizontal section 64. The stepped elevation is provided for reasons explained hereinafter. As seen in FIG. 6, the chassis 61 is substantially rectangular in plan and of open skeleton-like construction, the chassis 61 being adapted to carry the single long freight container 70, as indicated in FIG. 2, or the short freight container 80, as indicated in FIG. 4, as well as containers of various other lengths as indicated by the dashed lines 80' in FIG. 3. The chassis 61 has a length of about 40 feet, since most large containers now in use have lengths that are multiples of ten feet, twenty-foot and forty-foot containers being quite common.

The front central portion of the chassis 61 carries a depending kingpin, indicated at 65 in FIG. 5, that may be selectively clutched and declutched by the fifth-wheel mechanism 52 in the usual manner; and the rear end of the chassis 61 is supported by a pair of laterally extending and longitudinally spaced-apart axles 66 carrying at the opposite outer ends thereof road wheels 67 in the usual manner.

The long freight container 70 comprises an elongated longitudinally extending substantially rectangular base 71 carrying an upstanding hollow body or housing 72 provided with door structure, not shown, and defining a lading chamber, in the usual manner. Likewise, the short freight container 80 comprises an elongated longitudinally extending substantially rectangular base 81 carrying an upstanding hollow body or housing 82 provided with door structure, not shown, and defining a lading chamber in the usual manner. It will, of course, be understood at this time that such structure is conventional, and that containers of various different lengths, indicated by the dashed lines 80' in FIG. 3, are also constructed in this manner.

Referring now more particularly to FIGS. 5 and 6, the semi-trailer 60 further comprises a first laterally extending bolster 100 rigidly secured to the front end of the horizontal section 62 of chassis 61. A second laterally extending bolster 200 longitudinally spaced from the front bolster, is carried by the second horizontal section 64 of chassis 61. The rear bolster 200 is movable longitudinally relative to the chassis 61 in a manner hereinafter described.

A pair of laterally spaced-apart elevator motors 300 are carried by the extreme rear end of the chassis 61, respectively adjacent to opposite sides thereof and below the top of the rear horizontal section 64. Each of the motors 300 is of the piston-cylinder type and is selectively operated to effect expansion and contraction of the associated piston rod 301, so as to effect corresponding downward and upward movements of a foot 302 carried on the extreme lower end of the piston rod 301, as indicated in FIG. 4 (also, see FIGS. 2 and 3). The motor 300 is entirely conventional and is of the hydraulic operated type. Thus, the two motors or elevators 300 may be thrust downwardly, as shown in FIG. 3, together with elevation of the fifth-wheel mechanism 52, to effect lifting of the chassis 61 from an associated road; which lifting of the chassis 61 may be employed to level the same from side to side or to effect elevation thereof to the plane of the deck 92 of the railway flatcar 90, as indicated in FIG. 4.

As shown in FIGS. 5, 7, 11 and 12, the front bolster 100 is rigidly secured to the front end of the chassis 61 immediately rearwardly of a control console 600 that is mounted on the foremost edge of the chassis. The bolster 100 extends laterally of chassis 61 and essentially comprises a substantially horizontal bottom supporting plate 101, carrying an upstanding guard and guide structure 102 at the front edge thereof; whereby the front bolster 100 is adapted to receive and support the front end of any one of the various length freight containers, as indicated in FIGS. 2 and 3. The opposite outer ends of the front bolster 100 respectively carry a pair of anchoring devices, indicated at 400; which pair of anchoring devices 400 respectively cooperate with the opposite front corners of a mounted container 70 or 80, as explained more fully hereinafter.

As best shown in FIGS. 5 and 8 through 10 inclusive, the rear bolster 200 comprises an elongated laterally extending substantially U-shaped channel member 201, to the top of which is rigidly secured a substantially horizontal bottom supporting plate 202 carrying an upstanding guard and guide structure 203 at the rear edge thereof. A pair of longitudinally extending and laterally spaced apart bearing plates 204 is rigidly secured to the base of channel member 201. As best seen in FIGS. 9 and 10, the bearing plates 204 are of substantially the same width as the top surfaces 64 of the I-beams 68 which form the structural sections of chassis 61. A pair of downwardly depending bars 205 (FIG. 10), are rigidly secured to the base of the channel member 201 inwardly of plates 204. Upon placement of the bolster 200 on the chassis, the bearing plates 204 slidingly engage the top surfaces 64 of the I-beams 68; while the downwardly depending bars 205 prevent lateral movement of the bolster relative to chassis 61.

Channel member 201 is dimensioned such that when plates 204 and the support plate 202 are fastened thereto and the bolster 200 is placed on the chassis, the bottom support plate 101 of the front bolster 100 and the bottom support plate 202 of bolster 200 are in a generally horizontal plane. The front end of each bearing plate 204 may be upwardly inclined to facilitate movement of the bolster 200 along chassis 61.

The opposite outer ends of the rear bolster 200 also each respectively carry an anchoring device, indicated at 400; which pair of anchoring devices 400 respectively cooperate with the opposite rear corners of a mounted container 70 or 80, as explained more fully hereinafter.

As shown in FIGS. 8 to 10 and 16, a suitable locking arrangement is provided whereby the rear movable bolster may be selectively positioned longitudnially along the chassis to accommodate various length containers, while simultaneously precluding longitudinal movement of the rear bolster when a container is mounted thereon. With reference to FIGS. 5 and 16, it will be seen that chassis 61 has a series of longitudinally spaced plates 69 mounted thereupon, immediately below the top surface thereof. Each plate 69 has a pair of laterally spaced apart openings 69′ therethrough. A pair of downwardly depending plates 206 is rigidly affixed to the bottom support plates 202, which plates 206 are spaced slightly outwardly of the bearing plates 204. When the rear bolster 200 is mounted on the chassis, the bottom of each plate 206 overlies the plate 69 in the chassis. Further, plates 206 each have a pair of openings 206′ therethrough (FIG. 16), that are spaced apart the same distance as the openings 69′ in plates 69, whereupon moving the rear bolster longitudinally of the chassis to certain selective positions, the openings 206′ in plates 206 will be in alignment with the openings 69′ in plates 69 of the chassis. An outwardly extending shaft 207 is rigidly secured to each plate 206 intermediate the openings 206′.

To lock the rear bolster 200 in a selected position relative to the front bolster 100, a locking plate 208 having a central opening 209 and a pair of laterally spaced apart projections 210 is inserted over plate 206, whereupon the projections 210 are adapted to pass through the aligned openings 206′ in the plates 206 and 69′ in the plates 69. The outwardly extending shaft 207 on plate 206 will also pass through the center opening 209 of plate 208. A suitable lock pin 211 may then be passed through an opening 212 in the shaft 207 to prevent lateral movement of the locking plate 208 relative to plate 206, whereby the rear bolster is precluded from longitudinal movement relative to the chassis.

The plates 69 are located such that the rear bolster 200 may be selectively positioned substantially about 14 feet, 17 feet, 20 feet, 24 feet, 27 feet, 28 feet, 30 feet, 35 feet or 40 feet from the front bolster, measured from the inside of the guide structures 101 and 203 respectively, thereby to accommodate freight containers having bases thereon corresponding to the aforementioned longitudinal dimensions. Of course, suitable tolerances should be provided to prevent the base of an associated container from binding against the upstanding guide walls 101 and 203 of the respective bolsters.

Referring once again to FIGS. 5 and 6, the front portion of the chassis 61 carries a first side transfer mechanism, designated generally as 500F, arranged immediately below the front bolster 100 and substantially adjacent thereto. Also, as shown generally in FIGURES 5 and 6, a second side transfer mechanism, designated generally as 500R, is carried by the rear bolster 200 and is movable therewith longitudinally of the chassis. Each of the side transfer mechanisms comprise a pair of motors 501F and 501R, respectively, disposed in laterally spaced-apart relation adjacent opposite sides of the chassis.

Each of the motors 501F and 501R is of the piston-cylinder type and includes a piston rod 502 that may be selectively reciprocated between expanded and contracted positions with respect to the associated cylinder 503. The motors 501F and 501R are of the hydraulic operated type and are of substantially conventional construction.

Figure 7:
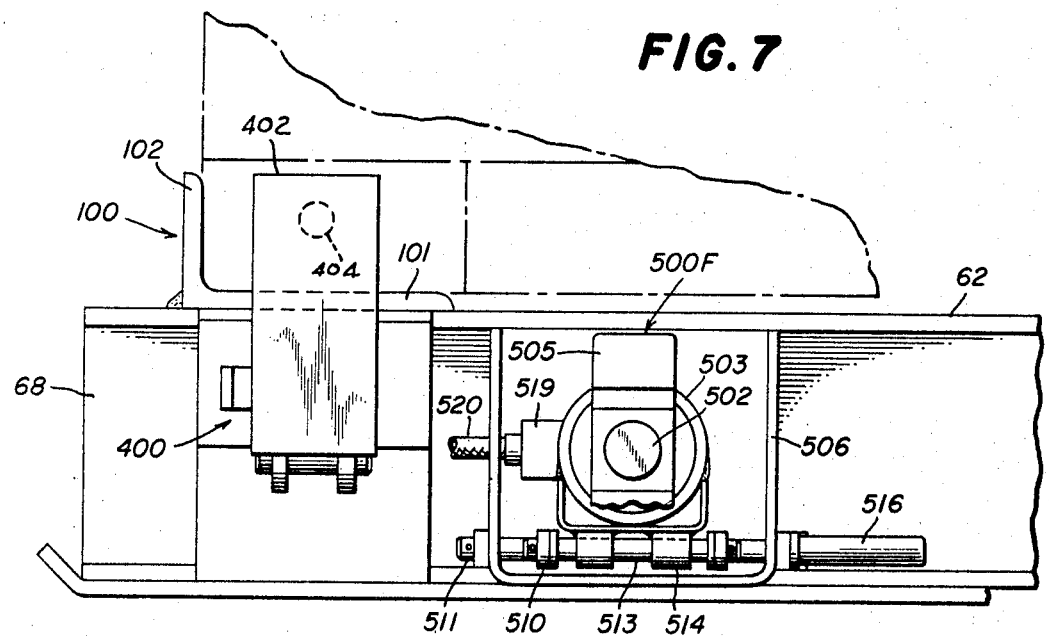
FIG. 7 is an enlarged fragmentary side elevational view of one end of the front bolster and the front transfer mechanism carried by the front end of the chassis of the road semi-trailer, as shown in FIG. 5.

The arrangement and operation of the front motors 501F will best be understood by reference to FIG. 14, wherein the mounting of one of the motors 501F is illustrated in some detail. More particularly, the rear end of the cylinder 503 of the motor 501F is pivotally mounted upon the adjacent side of the chassis 61 by an arrangement including a pivot pin 504; whereby the motor 501F projects laterally from the side (the right-hand side, as illustrated) of the chassis 61 and outwardly therebeyond; and whereby the centerline of the piston rod 502 is disposed substantially normal to the longitudinal centerline of the chassis 61. The extreme outer end of the piston rod 502 carries an engaging element, in this instance a pawl 505, that is employed in side loading and in side unloading of the freight containers 70 or 80 with respect to the chassis 61, as explained more fully hereinafter. When the piston rod 502 is contracted, the pawl 505 is disposed near the adjacent right-hand side of the chassis 61; and when the piston rod 502 is expanded, the pawl 505 is disposed laterally well outwardly from the adjacent right-hand side of the chassis 61. As seen in FIGS. 7, 11 and 12, a U-shaped member 506 extends outwardly from the chassis 61, past the end of cylinder 503, where the end thereof is inwardly turned at 507 to provide a shield for each motor arrangement. The inwardly turned ends 507 provide a passage through which the piston rods 502 and pawls 505 are adapted to reciprocate.

The cylinder 503 has an upper or operative position as shown in FIG. 14, and a lower or storage position as shown in FIG. 13. The cylinder 503 is biased into its upper position by an arrangement including an upwardly biased leaf spring 508 that is rigidly secured at one end thereof, by way of bolt 509, to the bottom surface of the I-beam 68 of chassis 61. The opposite end of spring 508 exerts an upward bias on the bottom of cylinder 503 as shown in FIG. 14; whereby the biasing of the cylinder 503 pivots the same upwardly about the pivot pin 504 and into its operative position.

The cylinder 503 may be moved downwardly to its storage position against the bias of the spring 508 causing corresponding pivoting of the cylinder 503 downwardly about the pivot pin 504, by an arrangement including a pair of links 510 disposed adjacent opposite sides of the cylinder 503. The inner end of each link 510 is rigidly connected to a shaft 511. The shaft 511 extends laterally below the cylinder and through a pair of aligned openings 512 in the side walls of the channel member 506 adjacent each front motor, where shaft 511 is rotatably mounted. The outer end of each link 510 is rigidly secured to a second laterally extending shaft 513 that passes through a pair of downwardly depending lugs 514 that are rigidly secured to the bottom of cylinder 503 at the outer end thereof. Rigidly fastened to one end of shaft 511 is a second link 515 having a handle 516 affixed to the opposite end thereof. It will be readily understood that by depressing handle 516, shaft 511 and thereby links 510 are rotated downwardly, causing shaft 513 to press downwardly against the lugs 514 on the bottom outer end of the cylinder 503, thereby moving the cylinder 503 downwardly from its position of FIG. 14 and into its previously mentioned storage position. To lock handle 516 in position, a locking pin 517 is movably secured to link 515 for lateral movement with respect thereto. A suitable aperture 518 (FIG. 14) is provided in member 506, said aperture accommodating lateral movement therethrough of locking pin 517. Thus, upon depressing handle 516 downwardly to the lock position, locking pin 517 may be laterally shifted into aperture 518 to thereby restrain the cylinder 503 against the biasing spring 508 and prevent upward movement of the cylinder to its operating position.

To complete the description of the front motors 501F, it will be observed that each motor includes at the inner end thereof a junction box 519 to which is connected a pair of flexible conduits 520. The conduits are appropriately interconnected to a control console 600 that is carried on the front end of the chassis 61. The control console 600 is operatively connected, when the semitrailer 60 is coupled to the tractor 50, to a hydraulic pumping system provided in the tractor 50 of conventional construction and arrangement.

The rear motors 501R as seen in FIGS. 6 and 8 through 10, also include the pivotally mounted cylinders 503, piston rods 502, and pawl elements 505 secured to each outer end thereof. Unlike the front pair of motors however, the rear motors 501R are pivotally connected to the opposite ends of a bar 213 that is in turn carried by a pair of horizontally extending plates 214 that are rigidly affixed to the front of the channel member 201 of the rear bolster 200, whereby the rear motors are carried by the rear bolster 200 for longitudinal movement therewith. It will also be observed from FIGS. 9 and 10 that in lieu of the pair of U-shaped members 506 that provide the shields for the front motors 501F, each rear motor has a shield 521 formed of metal plate. The shield 521 includes top, bottom and side walls and an open outer end through which the pawl element 505 is adapted to pass. It will also be observed from FIG. 9 that the spring 508 for each rear motor 501R is bolted to the bearing plate 204, rather than to the I-beam 68.

A threaded bolt 522 is secured to the shaft 513 that passes through the downwardly depending lugs 514 on the end of each cylinder. A crank 523 is threaded upwardly onto the bolt 522 until it abuts against the bottom wall of the shield 521. To move the cylinders to their inoperative positions, the crank is rotated in a clockwise direction, whereupon the bolt moves downwardly through the crank, which is limited in upward axial movement as soon as it bears against the bottom wall of the shield 521, whereupon the cylinder 503 in pulled downwardly. To release the cylinder for operation, the crank 523 is rotated in the counterclockwise direction until it is removed from the bolt 522.

It is noted in FIGS. 9 and 10 that the rear motors 501R each include the junction boxes 519 affixed to the outer walls of the cylinder 503 substantially adjacent the inner ends thereof. A pair of junction blocks 524 is rigidly affixed to the bar 213 carried by the horizontal plates 214, one box 524 being adjacent each end of the bar. A pair of flexible conduits 525 extend between each junction block 519 carried by the cylinders 503 and the junction block 524 on the respectively adjacent ends of the bar 213. A pair of flexible conduits 526 extend forward from each junction block 524 on bar 213, thereby to interconnect the rear motors 501R with the hydraulic pumping system.

To complete the description of the chassis, it will be seen that a suitable take up device, in this case a pair of conduit storage reels 527, is rotatably mounted at a point substantially midway of the length of the horizontal section 64 of chassis 61. The reels 527 are suitably interconnected with the hydraulic pumping system as indicated by the lines 528 in the plan view of the chassis shown in FIG. 6. The pairs of flexible conduits 526 extending from the junction blocks 524 on bar 213 are operatively connected to the reels 527, so that upon longitudinal movement of the rear bolster 200 relative to the chassis, the reels may be rotated to take up any slack and maintain the conduits 526 as taut as possible.

Still referring to FIGS. 5 and 6, and as heretofore noted, the extreme front end of the chassis 61 carries the upstanding control console 600 that is operatively connected to the hydraulic pumping system provided in the tractor 50. Further, the control console 600 is operatively connected by a conduit system partially shown by the conduits 520, 527 and 528, to the two front motors 501F, the two rear motors 501R, and the two elevator motors 300. Specifically, the control console 600 comprises six individual control devices 601 to 606, inclusive, respectively corresponding to the six motors named; whereby each of the six motors may be individually and selectively controlled in its respective expansion and contraction actions, in any manner well understood in this art. The six control devices 601 to 606, inclusive, are identical; whereby the control device 606 may correspond to one of the rear elevator motors 300, as viewed from above the chassis 61. The control device 606 is essentially comprised of a manually operable lever pivotally mounted adjacent to the lower end thereof to the top of the control console 600, the control lever 606 having front and rear positions respectively corresponding to the expansion position and to the contraction position of the motor 300. Thus, the six motors 300, 501F and 501R, may be selectively and simultaneously manually controlled from the control console 600 by corresponding operation of the appropriate control lever 601 to 606, inclusive.

As previously mentioned, the containers 70 and 80 are virtually identical, and as best shown in FIG. 17, the base 71 of the container 70 carries a pair of laterally extending racks 700 secured to the bottom thereof, one of the racks benig substantially adjacent each opposite end thereof. The racks may be of the type contemplated as one object of the present invention and as described in greater detail hereinafter. The racks 700 are adapted to cooperate with the pawls 505 of any one of the motors 501F or 501R as explained more fully below; and the racks 700 essentially comprise elongated plates having a plurality of openings 700a formed therein adjacent one side and arranged in laterally spaced-apart relation with respect to the base 71 of the cotnainer 70, as best shown in FIGS. 14 and 17. The side of the plate opposite the openings 700a provides a bearing surface that is adapted to engage the support surfaces 101 and 202 of the respective bolsters 100 and 200. The openings 700a are spaced inwardly from the ends of the base a distance substantially equal to the spacing between the motors and their associated bolsters.

As shown in FIGS. 14 and 15, the pawl 505 comprises two operating lugs 505a and 505b respectively disposed on the opposite sides thereof; and the piston rod 502 is mounted for rotation within the cylinder 503, so that either lug 505a or 505b may be rotated into a top or operative position with respect to a cooperating rack 700. Specifically, the lug 505a comprises a push or unloading lug, so that when the piston rod 502 is rotated to position the push lug 505a into an upper or operative position, as shown in FIG. 14, the pawl 505 is set into a pushing or unloading position. On the other hand, the lug 505b comprises a pull or loading lug, so that when the piston rod 502 is rotated to position the pull lug 505b into an upper or operative position, as shown in FIG. 15, the pawl 505 is set into a pulling or loading position.

Considering now the operation of the front and rear motors 501F and 501R to effect unloading of the long container 70 from the side of the chassis 61, and specifically from the front bolster 100 and the rear bolster 200, and referring to FIGS. 4, 14, 15 and 17, the pawls 505 of one of the front motors 501F is first set or operated into its push position, as specifically shown in FIG. 14, so that the push lug 505a thereof is disposed immediately adjacent to the front rack 700 carried by the bottom of the base 71 of the container 70 in its loaded position upon the bolsters 100 and 200. Similarly, the pawl 505 of the one of the rear motors 501R on the adjacent side of the chassis 61 is also set or operated into its push position with the push lug 505a thereof disposed immediately adjacent the rack 700 on the opposite end of the container. The crank 523 on one of the rear motors 501R may be removed from bolt 522, thereby releasing the rear motor for operation. The pin 517 on the corresponding front motor 501F may also be shifted to permit the front motor to move into its operative position. Upon releasing each of the front and rear motors, the respective push lugs 505a fall into one of the openings 700a in the respectively adjacent rack 700 under the bias of the springs 508. Then the corresponding control levers (assumed to be control levers 602 and 604) may be simultaneously manipulated so as to effect reciprocation of the corresponding rods 501 with respect to the cylinders 503, whereby the push lugs 505a cooperate with the respective racks 700 in order to slide the container 70 laterally with respect to the bolsters 100 and 200, and step-by-step from the bolsters onto an adjacent outside support, such as, for example, the deck 92 of the associated railway flatcar 90, as shown in FIG. 4, thereby to cause unloading of the container 70 from the bolsters 100 and 200 and from the chassis 61.

The mode of loading the container 70 upon the bolsters 100 and 200 from the deck 92 of the railway flatcar 90 is substantially the reverse of that described above, since in this case the pawls 505 of the proper front and rear motors are then rotated to position the associated pull lugs 505b into their upper operative positions, together with movement of the cylinders 503 from their storage positions into their operative positions as shown in FIG. 15. At this time the control levers 602 and 604 may effect reciprocation of the associated piston rods 502, whereby the pull lugs 505a of the pawls 505 cooperate with the asociated rack 700 to effect step-by-step pulling of the container 70 in the lateral direction and the consequent side loading of the base 71 of the container 70 onto the bolsters 100 and 200.

In view of the above description, it will be understood that the front and rear motors adjacent either side of the chassis are operative in an identical manner; whereby the container 70 may be loaded or unloaded with respect to either side of the chassis 61 and with respect to the associated bolsters 100 and 200. As previously noted, the short container 80 is of virtually identical construction to that of the long container 70, whereby to transfer the short container onto the chassis 61, all that is required is the longitudinal movement of the rear bolster 200 to the appropriate position on the chassis. It will, of course, be clear from the foregoing that to transfer containers of any of the various lengths represented by the dashed lines 80′ in FIG. 3, the rear bolster 200 is moved longitudinally of the chassis to the position thereon corresponding to the length of the container, whereupon the support surfaces 101 and 202 of the respective bolsters 100 and 200 are spaced apart the proper distance to accommodate the side loading or unloading of the associated freight container.

In view of the foregoing, it will be understood that the operation for side loading and side unloading of the various length containers 80′ with respect to the chassis 61 is substantially identical to that previously described in conjunction with the side loading and the side unloading of the long container 70. More particularly, the bottoms of the various length containers may be fitted with two laterally extending and longitudinally spaced apart racks 800, as indicated in FIG. 3, which racks may be identical to the racks 700 that are carried by the long container 70 as previously described. Since the rear transfer mechanism 500R is carried by the rear bolster 200 for longitudinal movement therewith, it will be clear that the required spacing between the bolster and the associated pawl elements with reference to the rack openings on the ends of the containers will be maintained.

As previously noted, one of the objects of the invention is to provide a portable rack element that may be easily secured to the bottom of the base of freight containers of various lengths, whereby the freight containers are usable with side transfer vehicles. A suitable rack element provided for this purpose is shown in FIGS. 17 through 21, inclusive. Virtually all of the freight containers manufactured today include a corner reinforcing member at each corner of the base, as indicated at 73 in FIGS. 18, 20 and 21. The corner reinforcing members 73 each have a number of passages therein, including a first generally horizontal passage 74, that extends parallel to the longitudinal axis of the freight container; and a second passage 75, extending upwardly from the bottom of the reinforcing member through the center thereof. The horizontal passage 74 is generally of a smaller periphery than the upwardly extending passage 75. The passages all intersect at a common point in the reinforcing members.

The passages in the corner reinforcing members 73 are provided to receive various devices commonly used either for transferring the containers, for locking the containers in position on railway flatcars, or for stationary supports.

As heretofore stated, one object of the present invention is to provide a portable rack element for use in combination with freight containers having these corner reinforcing members, whereby the container may be converted for use with various side transfer mechanisms. A rack of the type contemplated is shown in perspective in FIG. 19, wherein the rack is seen to comprise an elongated substantially U-shaped channel member 701, the width of the center section 702 of the channel member being greater than the normal width of each reinforcing member 73 as shown in FIG. 20, whereby the channel member 701 is adapted to straddle the reinforcing member, with a first upstanding wall 703 of the channel member abutting the outer wall of the base 71 of the freight container, and the opposite upstanding wall 704 abutting one of the laterally extending support braces 76 on the base of the container. The center section 702 of the channel member has a row of laterally spaced-apart openings 700A therethrough substantially adjacent to one of the upstanding side walls of the channel member.

Figure 8:
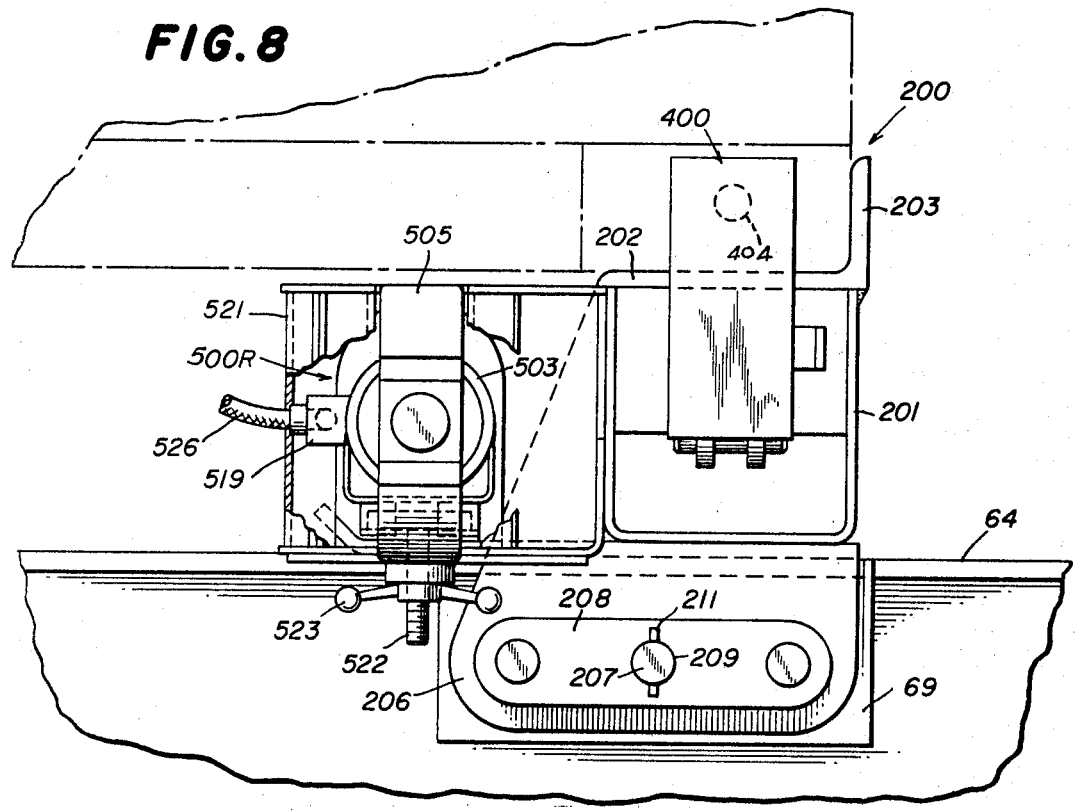
FIG. 8 is an enlarged fragmentary side elevational view of one end of the rear bolster and rear transfer mechanism carried thereby, as shown in FIG. 5.

The center section 702 further includes a pair (one only being shown) of upstanding projections 705 rigidly fixed thereto substantially adjacent to the second upstanding side wall of the channel member. The upstanding projections 705 are each of a mating configuration to the upwardly extending passages 75 of the corner reinforcing members 73. The upstanding projections 705 are laterally spaced-apart a distance substantially equal to the normal distance between the centers of the upstanding passages 75 of those reinforcing members adjacent to the same lateral side of the base of a freight container, so that upon positioning the channel member 701 on the bottom of the base 71, the upwardly extending passages in the corner reinforcing members 73 are adapted to receive in mating relation the upstanding projections 705 on the channel member (as seen in FIG. 8), with the upstanding walls 703 and 704 of the channel member overlying the elements of the base 71 as heretofore described. Upon so positioning the rack, the openings 700A in the rack will be spaced slightly inwardly from the reinforcing members 73, as best shown in FIG. 20, and the rack is thereafter adapted for use with the side transfer mechanisms as heretofore described.

A suitable laterally extending passage 706 may be provided through each of the upstanding projections 705, whereupon positioning the rack 700 on the bottom of container, the horizontal passage 73 in the corner reinforcing member will be in longitudinal alignment with the lateral passage 706 in the projection 705, thereby to receive a fastening element such as the bolt 707 therethrough. The rack element 700 is thereby adapted to be removably secured to the base of a freight container for cooperative engagement with a side transfer mechanism.

In lieu of removably securing the rack element 700 to the corner reinforcing members, it will, of course, be apparent that the upstanding side walls 703 and 704 of the channel member may be permanently fastened to the base of the container by welding them to the respective outer wall of the base 71 and the lateral support brace 76, as shown in FIG. 21.

It will, therefore, be apparent that the rack elements herein described provide rigid laterally extending structures that can be arranged adjacent to and below the opposite ends of the base of a freight container. The rigidity of the structures herein described also serves to strengthen the base of the container when secured thereto; this is particularly important when the container is made of a lightweight material such as aluminum, which can not normally be used with side loading facilities because of the relative weakness of aluminum and the high stresses placed on the containers during pushing and pulling thereof to effect side transferring.

In addition, by providing a detachable structure, the freight containers may be employed apart from the road vehicle in a condition with the rack structures removed from the base. This is extremely important in those instances where the weight of the container is critical, such as, for example, the nautical shipping industry, where the containers are almost invariably made of aluminum so as to reduce the dead weight carried by the ship. Moreover, the structure herein contemplated permits all the wear resulting from the sliding movement of the container over the bolsters to be imparted to the detachable structure, rather than to the base of the container, thereby prolonging the useful life of the container.

As previously noted, the opposite ends of each of the bolsters 100 and 200 carry pairs of anchoring devices 400; whereby it will be appreciated that when either container 70 or 80, or containers of various other lengths are mounted upon the bolsters as previously explained, the anchoring devices 400 are operated into the lock position with respect to the adjacent four corners of the mounted container, so as to anchor the same in place during travel of the road semi-trailer 60. The construction and arrangement of the individual locking devices 400 will best be understood by reference to FIGS. 9 through 12, inclusive; whereby the locking devices 400 each essentially comprises a pair of supports 401 secured to the outer ends of each bolster 100 and 200 immediately below the respective bottom support surfaces 101 and 202 thereof and spaced inwardly from the respective outer guide rails 102 and 203.

A member 402 is carried by shaft 403, which is pivotally mounted between the supports 401. Member 402 carries an inwardly extending anchor bolt 404 thereon, whereupon rotation of member 402 to the upright position (shown in FIGS. 9 through 12), when a freight container is mounted on the bolsters, each bolt 404 is adapted to engage a second horizontally extending passage 77 in each corner reinforcing member 73 of the container (FIG. 17), thereby anchoring the container to the bolsters.

A pair of aligned openings 405 is provided in the supports 401, and a similar opening 406 is provided in member 402; whereby when the member 402 is rotated to the upright or lock position, the openings 405 in supports 401 and the opening 406 in member 402 are in alignment and adapted to receive a locking shaft 407 therethrough. The bolt 404 may be released for movement to the open position (not shown), by removal of the locking shaft 407, whereby the member 402 is free to rotate outwardly and away from the end of the bolster.

In view of the foregoing, it is apparent that there has been provided an improved freight transportation system comprising an improved road semi-trailer incorporating movable support and side transfer mechanisms for effecting selective side loading and side unloading of freight containers of various lengths with respect to the chassis of the road semi-trailer, as required.

What is claimed is:

1. In a road vehicle capable of transporting and sidewise transferring freight containers of various lengths, the combination comprising, a chassis; a first elongated and laterally extending bolster carried by said chassis substantially adjacent to a first end thereof; a second elongated and laterally extending bolster carried by said chassis and longitudinally spaced from said first bolster, said second bolster being movable longitudinally relative to said chassis, whereby said first and second bolsters cooperate to support containers of various lengths respectively adjacent to the opposite ends thereof; said bolsters accommodating side loading and unloading of a freight container carrying on the bottom thereof an elongated longitudinally extending and generally rectangular base; said first and second bolsters being adapted to engage the base to accommodate sliding movements thereof in either lateral direction over either pair of corresponding ends of said bolsters incident to side loading and unloading of a container with respect to said chassis; a first side transfer mechanism carried by said chassis substantially adjacent to said first bolster; a second side transfer mechanism carried by said second bolster and movable therewith longitudinally of said chassis; each of said side transfer mechanisms including engaging means thereon cooperable with the respective opposite ends of the base of an associated freight container to effect sidewise loading or unloading of the freight container in either direction across said bolsters and between two external supports respectively positioned on opposite sides of said chassis; each of said side transfer mechanisms including at least one hydraulic motor operatively associated therewith to effect operation of said engaging means; a hydraulic pumping system; means interconnecting said hydraulic motor associated with said first transfer mechanism with said hydraulic pumping system; at least one flexible conduit interconnecting said hydraulic motor associated with said second side transfer mechanism with said hydraulic pumping system; and a take-up device carried by said chassis to take up any slack and maintain taut said flexible conduit upon the movement of said second bolster and said second side transfer mechanism longitudinally of said chassis.

2. A rack element for use in combination with a freight container for rendering said freight container usable with side transfer mechanism for laterally moving said container onto and off of adjacent supports, wherein said freight container includes on the bottom thereof an elongated, longitudinally extending and generally rectangular base, said base having reinforcing members rigidly affixed to each corner thereof, said reinforcing members each having a first passage therethrough extending parallel to the longitudinal axis of said base and a second passage extending upwardly through the bottom thereof intersecting with said first passage and extending therebeyond, said rack element comprising: an elongated U-shaped channel member, the width of the center section thereof being greater than the normal width of said reinforcing members, whereby said channel member is adapted to straddle said reinforcing members with one side thereof extending therebeyond; said center section of said channel member having a row of laterally spaced-apart openings therethrough substantially adjacent to a first side wall of said channel member and having first and second upstanding projections rigidly fixed thereto substantially adjacent to the second side wall of said channel member, said upstanding projections being of a mating configuration to the upwardly extending passages in said reinforcing members and being laterally spaced-apart a distance substantially equal to the normal distance between the centers of the second passages of the reinforcing members adjacent the same lateral side of said base, each of said upstanding projections having a lateral passage therethrough of substantially the same dimension as the first passages in said reinforcing members, whereupon laterally positioning said channel member on the bottom of said base, said second passages in said reinforcing members are adapted to receive in mating relation said projections on said channel member, with said first passages in said reinforcing members and said lateral passages in said projections being in longitudinal alignment with each other and adapted to receive fastening means therethrough, whereby said rack element is adapted to be removably secured to the base of said container for cooperative engagement with a side transfer mechanism.

3. In combination, a freight container carrying on the bottom thereof an elongated, longitudinally extending and generally rectangular base; a road vehicle including an elongated chassis; a first elongated and laterally extending bolster carried by said chassis substantially adjacent to a first end thereof; a second elongated and laterally extending bolster carried by said chassis and longitudinally spaced from said first bolster, said second bolster being movable longitudinally relative to said chassis, whereby said first and second bolsters cooperate to support containers of various length respectively adjacent to the opposite ends thereof; said bolsters accommodating side loading and side unloading of said freight container with respect thereto, said first and second bolsters being adapted directly to engage said base at opposite ends thereof to accommodate sliding movements thereof in either direction over either pair of corresponding ends of said bolsters incident to side loading and unloading of said container with respect thereto; a first pair of laterally spaced-apart motors carried by said chassis substantially adjacent to and below said first bolster; a second pair of laterally spaced-apart motors carried by and below said second bolster and movable therewith longitudinally of said chassis, each one of said motors being of the piston-cylinder type and including an elongated piston rod mounted for reciprocating movements relative to and laterally of said chassis and along a line disposed substantially normal to the corresponding one adjacent side edge of said chassis; a pawl element carried by each of said piston rods adjacent to the outer end thereof, each one of said piston rods having a stroke such that upon extension thereof the associated pawl element is positioned well outwardly from the corresponding adjacent end of the associated bolster, and upon contraction thereof the associated pawl element is positioned closely adjacent to the corresponding adjacent end of the associated bolster; first and second rack elements secured to the bottom of the base of said freight container substantially adjacent to the opposite ends thereof; said rack elements being adapted selectively to cooperate with said corresponding pawl elements of said first and second pairs of motors; each one of said pawl elements being selectively adjustable between loading and unloading positions of cooperation with said corresponding rack element, wherein each one of said pawl elements in its loading position clutches said corresponding rack element in response to the contraction of the corresponding one of said piston rods and overrides said rack element in response to the expansion of said piston rod, with the result that reciprocation of said piston rods at the corresponding ends of said bolsters effects inward step-by-step sliding movement of said base over the corresponding adjacent ends of said bolsters and the consequent side loading of said container upon said bolsters; each one of said pawl elements in its unloading position clutches said corresponding rack element in response to the expansion of the corresponding one of said piston rods and overrides said rack element in response to the contraction of said piston rod, with the result that reciprocation of said piston rods at the corresponding ends of said bolsters effects outward step-by-step sliding movement of said base over the corresponding adjacent ends of said bolsters and the consequent unloading of said container from said bolsters; a hydraulic pumping system; means interconnecting said first pair of motors with said hydraulic pumping system to effect operation thereof; at least one conduit storage reel rotatably mounted on said chassis, at least one flexible conduit operatively connected between one of said second pair of motors and said storage reel, at least one flexible conduit operatively connected between the other of said second pair of motors and said storage reel; means interconnecting said conduit storage reel with said hydraulic system to thereby effect operation of said second pair of motors, said conduit storage reel being operative to receive and store said flexible conduits as said second bolster and said second pair of motors are moved longitudinally relative to said chassis; and means carried by said chassis for selectively operating each of said motors to effect reciprocation of the corresponding piston rod so as to effect sidewise loading or unloading of said freight container in either direction across said bolsters and between two external supports respectively positioned on opposite sides of said chassis.

4. In combination, a freight container carrying on the bottom thereof an elongated, longitudinally extending and generally rectangular base; said base having a reinforcing member rigidly affixed to each corner thereof, each of said reinforcing members having a first passage therethrough extending parallel to the longitudinal axis of said base and a second passage extending upwardly from the bottom thereof and intersecting with said first passage and extending therebeyond; a road vehicle including an elongated chassis; a first elongated and laterally extending bolster carried by said chassis substantially adjacent to a first end thereof; a second elongated and laterally extending bolster carried by said chassis and longitudinally spaced from said first bolster, said second bolster being movable longitudinally relative to said chassis, whereby said first and second bolsters cooperate to support containers of various length respectively adjacent to the opposite ends thereof; said bolsters accommodating side loading and side unloading of said freight container with respect thereto, said first and second bolsters being adapted directly to engage said base at opposite ends thereof to accommodate sliding movements thereof in either direction over either pair of corresponding ends of said bolsters incident to side loading and unloading of said container with respect thereto; a first side transfer mechanism carried by said chassis substantially adjacent to said first bolster; a second side transfer mechanism carried by said second bolster and movable therewith longitudinally of said chassis; and first and second rack elements secured to the bottom of the base of said freight container substantially adjacent to the opposite ends thereof; each of said rack elements comprising an elongated substantially U-shaped channel member, the center section of said channel member having a row of laterally spaced-apart openings therethrough substantially adjacent to a first side wall of said channel member and having first and second upstanding projections rigidly fixed thereto substantially adjacent to the second side wall of said channel member, said upstanding projections each having a mating configuration to said upwardly extending passages in said reinforcing members; said first and second upstanding projections being laterally spaced-apart a distance substantially equal to the distance between the centers of said second passages of said reinforcing members adjacent the same lateral side of said base; each of said upstanding projections having a lateral passage therethrough of substantially the same dimension of said first passages in said reinforcing members, whereupon positioning of said channel member on the bottom of said base, said second passages in said reinforcing members adjacent the same lateral side of said base are adapted to receive in mating relation said projections of said rack element, with said first passages in said reinforcing members and said lateral passages in said projections being in longitudinal alignment and adapted to receive fastening means therethrough whereby said rack elements may be removably secured to the base of said container for cooperative engagement with said transfer mechanism; each of said side transfer mechanisms including means thereon cooperable with said corresponding first and second rack elements to effect sidewise loading or unloading of said freight container in either direction across said bolsters and between two external supports respectively positioned on opposite sides of said chassis.

References Cited

UNITED STATES PATENTS

| | | |
|---|---|---|
| 2,996,206 | 8/1961 | McKee. |
| 3,219,218 | 11/1965 | Hand _____ 214—516 |
| 3,254,875 | 6/1966 | Dempster et al. ___ 214—516 XR |
| 3,310,188 | 3/1967 | Dempster et al. _____ 214—516 |

FOREIGN PATENTS

| | | |
|---|---|---|
| 859,759 | 1/1961 | Great Britain. |

ALBERT J. MAKAY, *Primary Examiner.*

U.S. Cl. X.R.

214—38